(12) United States Patent
Tan et al.

(10) Patent No.: US 12,044,592 B2
(45) Date of Patent: Jul. 23, 2024

(54) SYSTEM AND METHOD FOR DETECTING OPTICAL POWER OF DRY OPHTHALMIC LENSES

(71) Applicant: EMAGE AI PTE LTD, Singapore (SG)

(72) Inventors: Jia Yaw Tan, Johor (MY); Sy Hieu Dau, Dong Nai (VN); Hoang Bao Nguyen, Ho Chi Minh (VN)

(73) Assignee: EMAGE AI PTE LTD, Singapore (SG)

( * ) Notice: Subject to any disclaimer, the term of this patent is extended or adjusted under 35 U.S.C. 154(b) by 259 days.

(21) Appl. No.: 17/349,452

(22) Filed: Jun. 16, 2021

(65) Prior Publication Data

US 2022/0042876 A1 Feb. 10, 2022

(30) Foreign Application Priority Data

Jun. 16, 2020 (SG) .......................... 10202005702W

(51) Int. Cl.
*G01M 11/02* (2006.01)
*G02C 7/04* (2006.01)

(52) U.S. Cl.
CPC ........... *G01M 11/0228* (2013.01); *G02C 7/04* (2013.01)

(58) Field of Classification Search
CPC ......... G01M 11/0228; G01M 11/0235; G01M 11/0242; G01M 11/0264; G01M 11/02; G01M 11/0207; G01M 11/0257; G01M 11/04; G01M 11/081; G02C 7/04
See application file for complete search history.

(56) References Cited

U.S. PATENT DOCUMENTS

| | | | | |
|---|---|---|---|---|
| 6,154,274 A | * | 11/2000 | Davis | G01M 11/0235 356/124 |
| 9,140,545 B2 | * | 9/2015 | Vertoprakhov | G01M 11/0278 |
| 10,321,820 B1 | | 6/2019 | Gollier et al. | |
| 2005/0219514 A1 | | 10/2005 | Imaizumi | |
| 2012/0133958 A1 | * | 5/2012 | Widman | G01M 11/0207 356/632 |
| 2013/0307965 A1 | * | 11/2013 | Widman | G01M 11/02 348/135 |
| 2016/0061689 A1 | * | 3/2016 | Morley | G01M 11/0271 356/496 |

(Continued)

FOREIGN PATENT DOCUMENTS

| | | |
|---|---|---|
| CN | 103799974 A | 5/2014 |
| CN | 104662402 A | 5/2015 |
| CN | 109556834 A | 4/2019 |

(Continued)

*Primary Examiner* — Edmond C Lau
*Assistant Examiner* — Judy Dao Tran
(74) *Attorney, Agent, or Firm* — Mannava & Kang, P.C.

(57) ABSTRACT

A system for detecting refractive power of a dry ophthalmic lens under inspection, comprising: a) a top camera 10 arranged to view the ophthalmic lens 40 through an optical module 25; b) an optically transparent surface 30 to position the ophthalmic lens 40 for inspection; c) a precisely calibrated glass target 50 suitably positioned on a transparent plate 60, arranged to achieve an image of the ophthalmic lens 40 overlaid with the image of the pattern on the target 50; d) at least one light source having multiple wavelength LEDs to capture different images under multiple lighting conditions.

3 Claims, 5 Drawing Sheets

(56) References Cited

U.S. PATENT DOCUMENTS

2019/0323920 A1* 10/2019 Smorgon ........... G01M 11/0228

FOREIGN PATENT DOCUMENTS

| | | | |
|---|---|---|---|
| CN | 110389021 | A | 10/2019 |
| JP | H11337444 | A | 12/1999 |
| JP | 2016540994 | A | 12/2016 |
| JP | 2018031764 | A | 3/2018 |
| JP | 2019060851 | A | 4/2019 |
| JP | 2019522781 | B | 8/2019 |
| JP | 6577690 | B1 | 9/2019 |
| JP | 2019215321 | A | 12/2019 |
| TW | 201522933 | A | 6/2015 |

* cited by examiner

| Avg Distance (Pixels) | X-3 | X-2 | X-1 | X | X+1 | X+2 | X+3 |
|---|---|---|---|---|---|---|---|
| Y-3 | 167.88 | 167.01 | 166.38 | 166.63 | 167.13 | 166.88 | 166.63 |
| Y-2 | 167 | 166 | 165.76 | 166.88 | 166.88 | 166.75 | 166.63 |
| Y-1 | 167 | 166.25 | 165.76 | 166.38 | 166.5 | 166.5 | 166.38 |
| Y | 166.63 | 165.75 | 165.63 | 166 | 166 | 165.88 | 166.38 |
| Y+1 | 166 | 166.13 | 166.38 | 165.38 | 165.13 | 166 | 166.38 |
| Y+2 | 167 | 166.88 | 166.38 | 165.5 | 165.88 | 166.63 | 167.25 |
| Y+3 | 167.88 | 167.38 | 166.63 | 166.38 | 166.5 | 167 | 167.5 |

Fig. 8A  $Y = -9E-07x^4 + 0.0005x^3 - 0.1281x^2 + 14.204x - 630.16$

| Power (Dioptre) | X-3 | X-2 | X-1 | X | X+1 | X+2 | X+3 |
|---|---|---|---|---|---|---|---|
| Y-3 | 9.86 | 9.58 | 9.38 | 9.46 | 9.62 | 9.54 | 9.46 |
| Y-2 | 9.58 | 9.25 | 9.17 | 9.54 | 9.54 | 9.5 | 9.46 |
| Y-1 | 9.58 | 9.33 | 9.17 | 9.37 | 9.42 | 9.42 | 9.37 |
| Y | 9.46 | 9.16 | 9.12 | 9.25 | 9.25 | 9.21 | 9.37 |
| Y+1 | 9.25 | 9.29 | 9.37 | 9.04 | 8.95 | 9.25 | 9.37 |
| Y+2 | 9.58 | 9.54 | 9.37 | 9.08 | 9.21 | 9.46 | 9.66 |
| Y+3 | 9.86 | 9.7 | 9.46 | 9.37 | 9.42 | 9.58 | 9.74 |

| Avg Distance (Pixels) | Power (Dioptre) |
|---|---|
| 166.396 | 9.375 |
| 154.29 | 4.75 |
| 134.851 | -5 |
| 127.732 | -9.5 |
| 120.962 | -14.375 |
| 114.322 | -20 |

SYSTEM AND METHOD FOR DETECTING OPTICAL POWER OF DRY OPHTHALMIC LENSES

PRIORITY

The present application claims foreign priority to Singapore patent application 10202005702W, filed Jun. 16, 2020, which is incorporated by reference in its entirety.

FIELD OF THE INVENTION

The present invention relates to an apparatus and method for detecting refractive power of Ophthalmic lenses. More specifically, the present invention relates to an apparatus and method to detect the refractive power of dry contact lenses suitable for integration as an inline inspection system at automatic contact lens production machines.

BACKGROUND OF THE INVENTION

The manufacturing of ophthalmic lenses, in particular single wear soft contact lenses, may be manufactured in a fully automated manufacturing line with the aid of reusable molds. In order to ensure top quality of the said contact lenses, an optical inspection system is essential to ensure high quality for the customer. Ophthalmic lenses or contact lenses are produced in different categories of refractive power, which makes it essential to ensure that they are inspected according to their manufacturing specifications. Manual methods are slow and selective sample inspection of lenses pose an issue of inadequate quality checks associated with such methods. It is therefore essential and an important requirement for contact lens manufacturers to ensure 100% of the products produced are inspected and segregated according to their characteristics. Fast, reliable and consistent methods of inspection are necessary to be deployed to guarantee reliable product quality.

Ophthalmic lenses are manufactured to suit different types of eye characteristics. The contact lenses need to be appropriately categorized before distribution according to their optical power. Several prior art measuring systems for optical power exist, but one of the most popular systems involves the use of a motorised indexing system relying on focal points on the top and bottom surfaces of the contact lens. However this kind of apparatus cannot be integrated into high speed automated manufacturing systems because of the time required to inspect each lens, making them unsuitable for such a purpose. One other type of inspection system to detect the optical power of contact lenses involves the use of motorised zoom lenses to focus on different points of the contact lenses and applying certain algorithms to match the variation in zoom factor values to determine the refractive power of lenses. Again here, due to the time required to perform the process, such systems cannot be integrated in high speed production lines for manufacturing contact lenses.

Manual inspection systems requiring human intervention are not practical for high-speed production because they are too slow, because human inspectors are prone to making biased judgments, and because inspection results among different inspectors are not uniform.

The principal difficulty in inspecting contact lenses has been to perform the examination immediately after they are molded. If the inspection of the contact lenses for their refractive power can be performed immediately after they are molded, any process related problems or defects can be quickly addressed. A significant amount of defective contact lenses can be prevented from being manufactured. Typical process of contact lens inspection is traditionally carried out down the line at the final process of manufacturing where the lenses are suspended in saline solution whose refractive characteristics has to be considered when calculating or determining the actual refractive power of the contact lens under inspection. Defects found at this final inspection stage makes it difficult for manufacturers to analyse the problem and introduce steps to correct the process at the molding process. Additionally the delayed flagging of issues results in significant loss of material and output to the customer. Therefore, it is an object of the invention to overcome the afore-mentioned disadvantages of the prior art and to suggest a method that greatly increases the efficiency of inspecting the refractive power of lenses that is suitable for integration into an automated system or apparatus for quick, reliable and accurate inspection.

SUMMARY OF THE INVENTION

According to one aspect of the present invention, there is a system and method provided for automated inline determination of the refractive power of an ophthalmic lens in an automated manufacturing line for ophthalmic lenses, for example soft contact lenses before being sent for the final stage packing process.

The method comprises the steps of:

Providing an inspection platform comprising an optically transparent bottom having a flat Surface with ophthalmic lens placed on it with the convex side up, and positioning the platform in a predetermined location under inspection module;

Providing a calibrated glass target with pre etched pattern consisting of accurately placed squares of black and white colour. The glass target is positioned below the contact lens holder so to create an overlay image of the grid pattern and the contact lens at the camera detector; Providing a light source and a high resolution digital camera for receiving light coming from the light source after having passed through the calibrated glass target and the ophthalmic lens placed on the transparent surface of the platform and impinging on the camera detector, thus generating signals at the output of the camera.

Measuring the signals generated at the detector and creating a table of values of parameters which is related to refractive power (in pixel unit) of several contact lenses with known refractive power. The values are generated using several overlay images of several contact lenses with known refractive power or otherwise referred to as Golden samples and subsequently measuring the distances between several adjacent squares within a predetermined optical zone of each contact lens image and tabulating the results to form a reference table. The golden samples include a range of positive and negative refractive powered contact lenses.

Determination of the refractive power of the ophthalmic lens is performed while the ophthalmic lens is placed on a transparent plate. The term "refractive power" as used herein is to be understood in a very general sense, for instance as one or a combination of refractive properties of an ophthalmic lens, such as for example the spherical refractive power of a spherical Soft contact lens, the cylindrical power of a toric contact lens, the orientation of the cylinder axes, aberrations, etc.

The present invention provides a novel process for detecting the refractive power of the contact lens starting with the acquisition of the contact lens image overlayed with the image of the pattern in the calibration glass target. This process is repeated for several contact lenses of known refractive powers otherwise referred to as golden samples.

The present invention further provides a novel process for detecting the refractive power of the contact lenses comprising a means for creation of a reference or calibration table of refractive power values that is proportional to the average distances (measured in pixels) between four adjacent squares calculated and tabulated for each and every square in the optical zone of the contact lens image. This process is applied to every single image acquired for every single Golden sample. The proportional refractive power of the said lens is arrived at by applying a certain formula to average distance values in pixels for each value in the table. As an example, a 7×7 area square in the center of the optical zone of the contact lens is chosen. Depending upon the complexity or specification required by the customer, the area identified within the optical zone may be increased or decreased.

The present invention further provides a Novel method in producing an extrapolated graphical line chart with Average distance values in pixels representing the X Axis and refractive power in units of Dioptre representing the Y axis.

Therefore, performing the aforesaid method according to the invention for dry contact lenses is particularly effective, since the refractive power measured or detected during the production of contact lenses is improved by utilising the interpolated Graph. The final refractive determined using the graph or the table may further be communicated via electronic means to enable integration to third party equipment.

BRIEF DESCRIPTION OF THE DRAWINGS

A complete understanding of the present invention may be gained by considering the following detailed description together with the accompanying drawings, in which:

FIG. 2 shows a sample of a calibrated glass target 50 which is located within the holder 60 in FIG. 1a.

FIG. 8Aa is an example formula to match distances to known refractive power of a contact lens.

DETAILED DESCRIPTION

Figures 1, 1A:
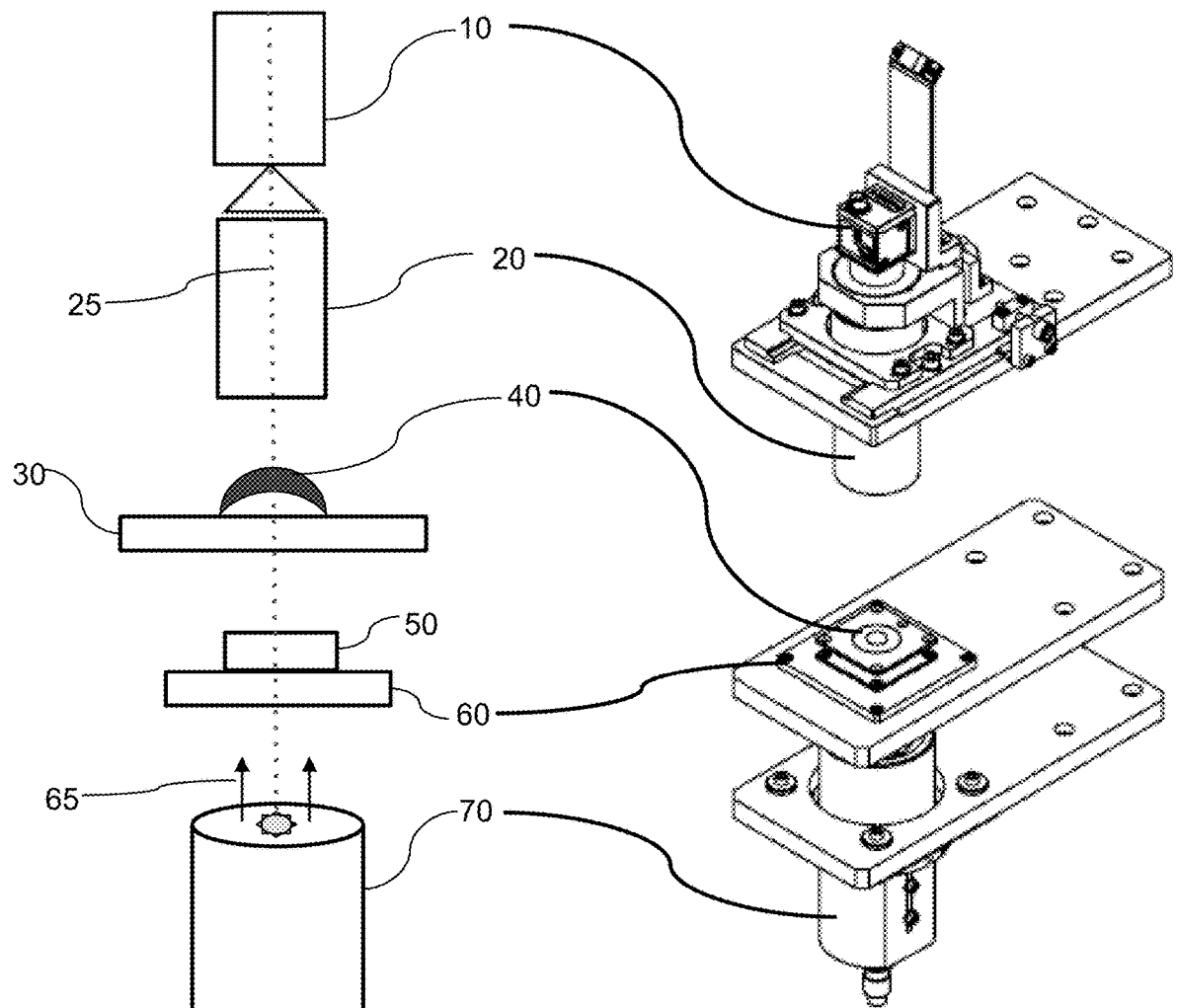
FIG. 1 shows a preferred embodiment of the invention. The apparatus comprises a high resolution camera 10, an optical lens 20, to view the lens 40 positioned on glass platform 30, a calibrated glass target 50 suitably positioned on another glass platform 60, and an LED based illumination module 70 to direct the illumination 65 towards the contact lens 40, all of the above suitably aligned to the optical axis 25 of the apparatus. The illumination module 70 is controlled by a programmable strobing controller (not shown) to control the illumination trigger pulse width and the intensity of the LED segments.
FIG. 1a shows an isometric view of the optical assembly showing some of the different parts of the invention.

FIG. 1 shows an embodiment of a first aspect of the present invention which is a detection setup or apparatus to detect the refractive power of dry contact lenses. The preferred embodiment comprises the following parts.

The High Resolution camera 10 coupled with the optical lens 20, is focussed on the calibrated glass target 50 mounted on another glass platform 60. An LED based illumination source 70 is arranged to direct light 65 through the transparent bottom 60 and the calibrated glass target 50 all of which are suitably positioned in line with the optical axis 25. The LED light further illuminates the ophthalmic lens 40 which is positioned on the Glass platform 30 with its convex surface facing the Optical lens 20. The light having passed through the contact lens 40 and carrying information of the lens superimposed with the pattern etched or printed on the calibrated Glass target 50 is captured by the camera 10 after being focussed by the optical lens 20. An isometric view of the invention in FIG. 1 is illustrated in FIG. 1a.

Figure 2:
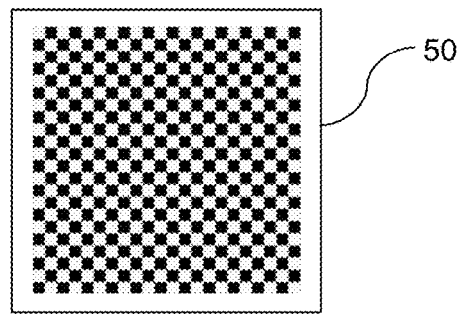

In FIG. 2, a typical calibrated glass target 50 or calibration glass plate, is shown with a pattern consisting of alternative Black and White squares that may be either etched or printed. The pattern dimensions are highly precise and is one of the critical element of the apparatus that plays a major role in determining the refractive power of the contact lens. The calibrated glass target 50 is commercially available etched or printed with different designs of patterns. Different calibration target patterns may be selected depending upon the type of inspection and accuracy of inspection required by the customer.

Figure 3:
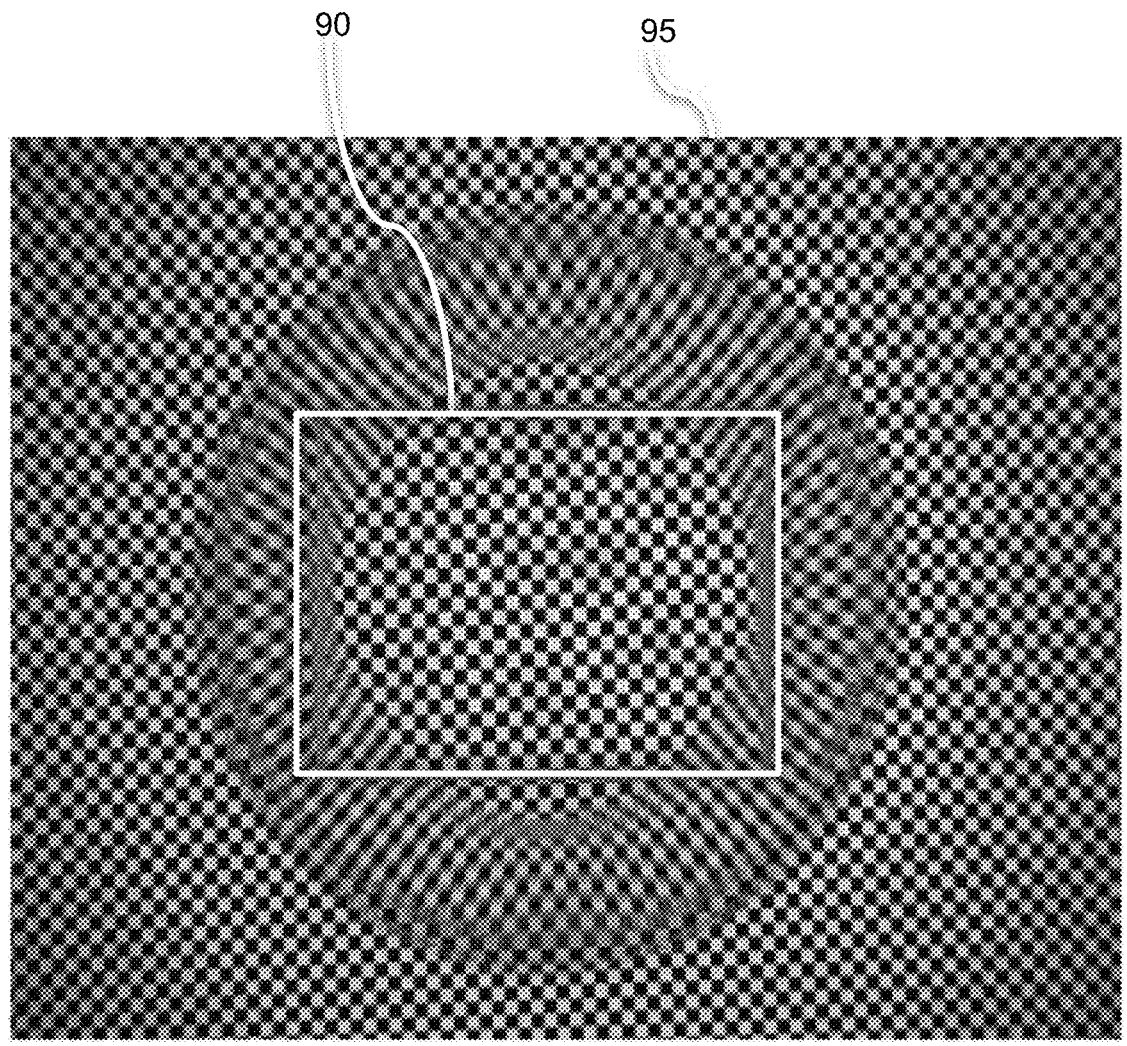
FIG. 3 shows an illustration of an image 95 of the calibrated glass target 50 overlayed with the image of a contact lens 40 in FIG. 1 of a known refractive power, and the rectangle area enclosed by the box 90 illustrates the optical area of interest for the invention.

In FIG. 3, an image 95 is shown that represents an overlayed image of the calibration target and the contact lens as captured by the camera 10 in FIG. 1. The area enclosed by the rectangle 90 in FIG. 3 represents the optical area of interest.

Figure 4:
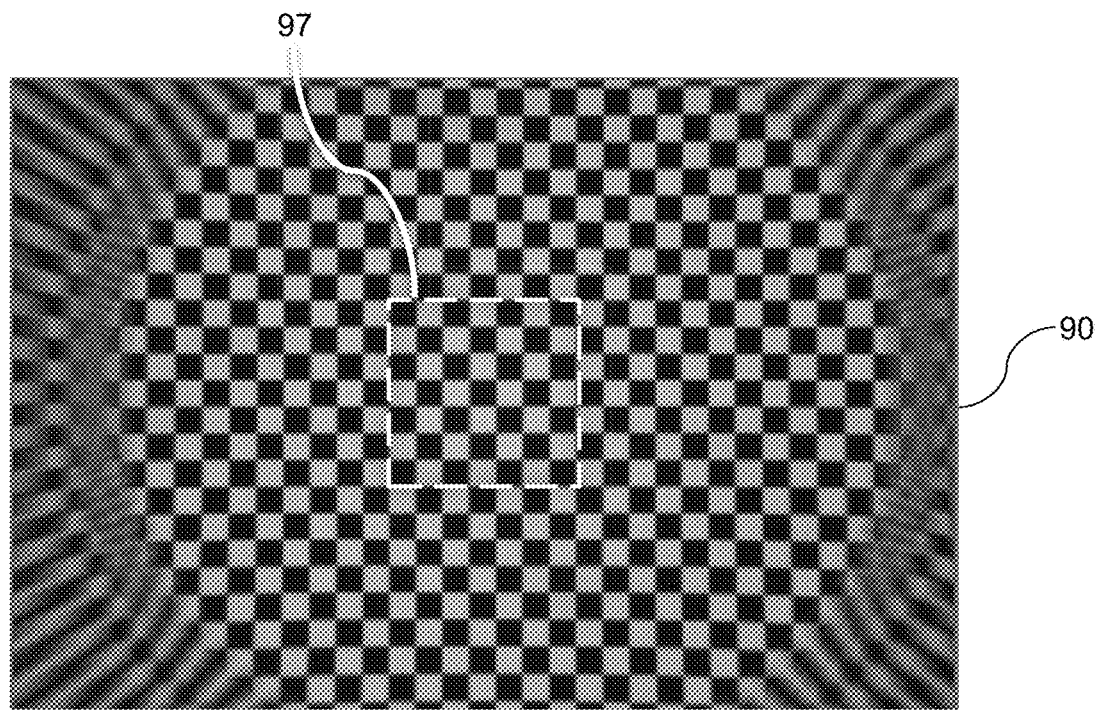
FIG. 4 shows a zoomed image of the area 90 in FIG. 3 wherein the majority of squares in the optical zone are clearly visible, wherein a chosen set of 7×7 squares in the centre of the optical zone 90 is enclosed by the box 97.

In FIG. 4, a smaller image area 97 is selected preferably in the centre of image area 90, consisting of 7×7 square boxes and each square boxes consisting of approximately 166 pixels. The area 90 is processed by image processing algorithms to detect the edges of all the 49 squares as a first step. In the next step each square is filled with predetermined gray scale values to clearly separate them from their neighbouring squares.

Figure 5:
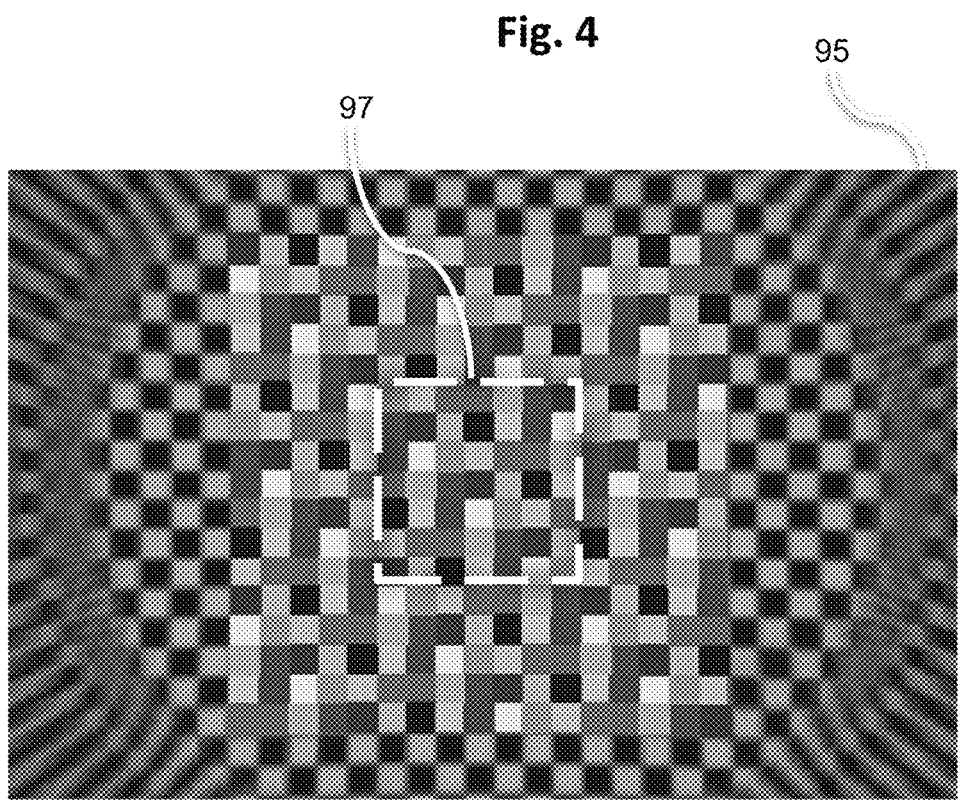
FIG. 5, illustrates the area 97 in FIG. 4 where the actual refractive power of the contact lens 40 is to be detected. The area 97 in FIG. 6 is an enlarged view of the 7×7 square boxes (For eg: a lens with power 9.375 dioptre), with each box preferably enclosing 166 pixels. To identify each box in FIG. 6, the horizontal axis is labelled as A,B,C,D,E,F & G and the vertical axis labelled as 1,2,3,4,5,6 & 7.
Figures 6, 7, 8:
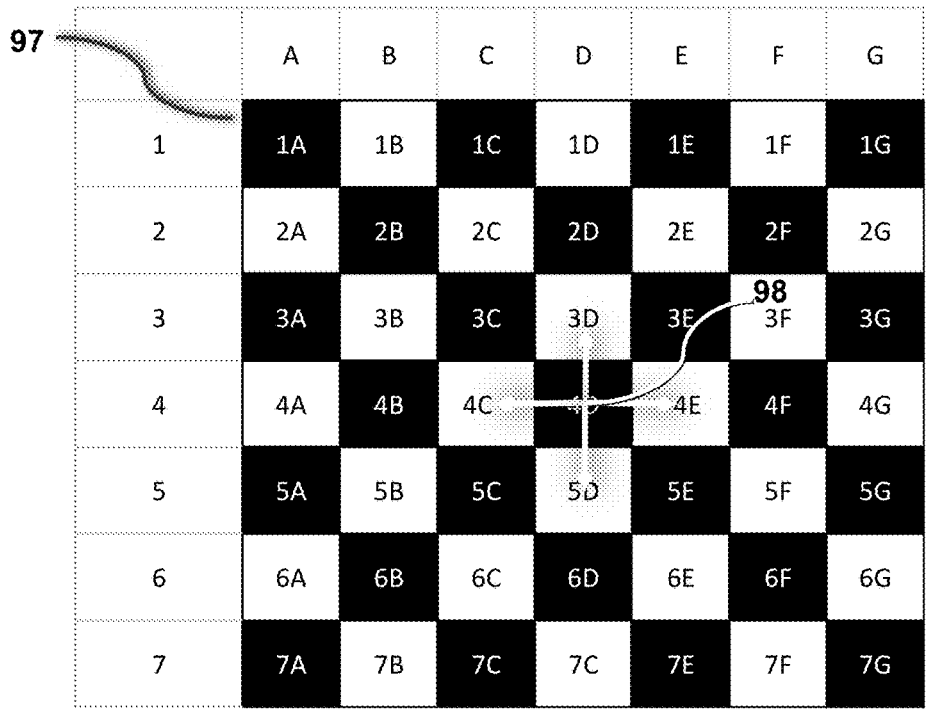
FIG. 7 shows a table with average values of distances in Pixels measured between adjacent squares of FIG. 6.
FIG. 8 shows a table with values in Dioptre (Refractive power), after applying the values of distances in FIG. 7 to the formula in FIG. 8A.

FIGS. 5-6, illustrate an example of the end result after the image analysis and processing with each square box filled with identical gray scale values to clearly differentiate themselves from their neighbouring square boxes, with the Horizontal row labelled as A, B, C,D,E,F & G and the vertical row labelled as 1,2,3,4,5,6 & 7.

Area 97 is determined by the customer during the teaching process which is not described in detail, as it is outside the scope of this invention. As evident from the illustration in FIG. 4, area 97 is a 7×7 square area in the centre of the area 95 and the most important location where the refractive power of the contact lens is to be determined. While the rest of the area is also important to understand the distribution of refractive power around the entire contact lens, it falls beyond the scope of the present invention and hence not discussed in detail.

In FIG. 6, the area 97 is enlarged to show 7×7 pixels at the centre of the optical zone. The area 97 is further analysed to determine the refractive power of the contact lens. As a first step, the centre of all pixels is located and distances between all its neighbouring horizontal and vertical pixels is measured. For example, In FIG. 6, the illustration shows nine boxes starting with square box 4D surrounded by boxes 4C,3C,3D,3E,4E,5E,5D & 5C. Distances in pixels are measured from the centre of box 4D represented by position 98 to the centre of boxes 4C,3D, 4E and 5D. For high accuracy and repeatability of measuring distances between the centre of pixels, sub pixeling algorithms are implemented. Subsequently, the average of all the four distances in pixels, namely distances between 4D & 3D, 4D & 4C, 4D & 5D & 4D & 4E is entered in the position represented by box position 4D in the table FIG. 7 which is represent by the position XY in FIG. 7 and also referred as the centre reference position. It is important to note that distances of all the boxes FIG. 7 move positively to the right and top of position XY and negatively to the left and bottom of position XY. For eg: Distance value in pixels for box 1A in FIG. 6 is represented by position X-3, Y-3 in FIG. 7 which is 166.78. The above process is subsequently applied to all the boxes in FIG. 6 and their respective values are entered in the table of FIG. 7. In this example, the resulting table shown in FIG. 7 is a complete list of average distances of the 7×7 box matrix box 97 in FIG. 6, which represents a contact lens or golden sample with a known refractive power of 9.37 (refractive power in dioptre).

With the refractive power already known and using the table in FIG. 7, a formula is arrived at to match the distances to the known refractive power of the contact lens. A typical resulting formula is as follows:

$$Y = -9E{-}07x^4 + 0.005x^3 - 0.1281x^2 + 14.204x - 630.16$$

It is important to note that the above formula is an example illustrated for understanding purposes and a person skilled in the art will be able to change or modify the formula to suit the contact lens material, design and process of different manufacturers.

The formula in FIG. 8A is applied to each and every value of the table in FIG. 7, to arrive at a new table of dioptre (refractive power) values as shown in FIG. 8. The average of all the dioptre values in FIG. 8 represents the dioptre value or the refractive power of the contact lens.

Figures 9, 10:
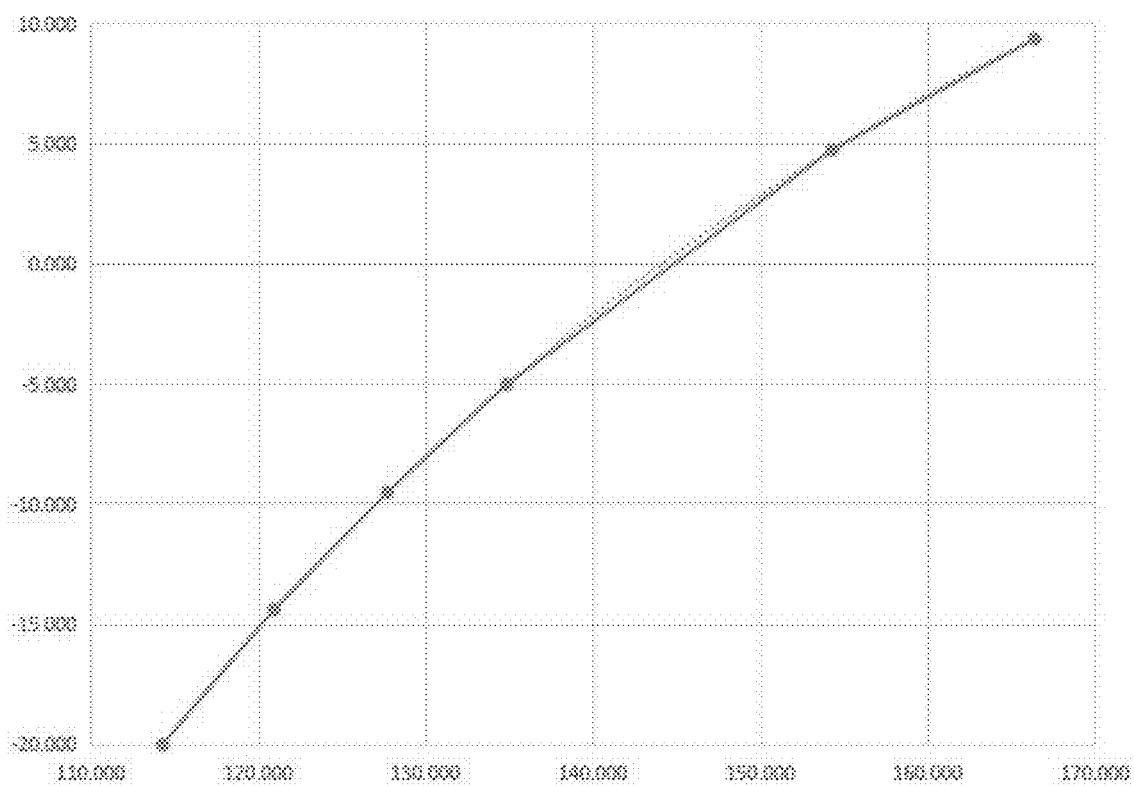
FIG. 9 is a reference table of distances versus dioptre values for a set of contact lenses or golden samples preselected with known refractive power.
FIG. 10 is an extrapolated graph plotted based on the values in the reference table in FIG. 9 with X axis representing the average distance values and the Y axis representing the proportional dioptre values (refractive power).

In the subsequent step, a different contact lens with known refractive power is used to arrive at a new table similar to the one shown in FIG. 7 and FIG. 8. In the table shown in FIG. 9 a total of six contact lenses otherwise known as Golden samples are utilised. As shown in the reference table FIG. 9, each contact lens represents a different refractive power along with their respective average distance between selected 7×7 boxes. To create the reference table in FIG. 9, a range of contact lenses or Golden samples are carefully selected to cover a wide range of refractive powers commonly manufactured in the industry. In the final step, the table in FIG. 9 is plotted in a graph as shown in FIG. 10 where the X axis represents the average distance and the Y axis representing their respective dioptre values. A simple analysis of the graph in FIG. 10 shows shorter distance values for contact lenses with negative refractive power with gradually increasing distances for contact lenses with Positive refractive power. The graph in FIG. 10 and Table in FIG. 9 is an illustration and the extrapolated line in FIG. 10 can be further smoothened by including more Golden samples during the creation of the reference or calibration table in FIG. 9, to achieve better accuracy of detecting refractive power in contact lenses in normal production.

The invention claimed is:

1. A method for detecting the refractive power of a dry ophthalmic lens under inline inspection, comprising:
    capturing an image of the dry ophthalmic lens superimposed with an image of a calibrated target;
    filling predetermined gray scale values to each square of a selected 7×7 square area of the captured image:
    measuring average distances between neighbouring squares and a central pixel of the selected 7×7 square area, wherein the neighbouring squares neighbour the central pixel;
    calculating a dioptre value of the lens for each of the measured average distances;
    determining a refractive power of the lens by comparing the dioptre value with a calibration table and graph; and
    communicating results to a networked computer for further processing.

2. A method according to claim 1 wherein the ophthalmic lens is inspected in a production line with a convex side of the lens facing a camera.

3. A method according to claim 1 wherein the ophthalmic lens and the calibration target are illuminated with a backlight source to enable capturing a sharp contrast image to be acquired by a camera.

* * * * *